United States Patent [19]

Abramson et al.

[11] Patent Number: 5,506,987
[45] Date of Patent: Apr. 9, 1996

[54] AFFINITY SCHEDULING OF PROCESSES ON SYMMETRIC MULTIPROCESSING SYSTEMS

[75] Inventors: Kenneth D. Abramson, Seattle; H. Bruce Butts, Jr.; David A. Orbits, both of Redmond, Wash.

[73] Assignee: Digital Equipment Corporation, Maynard, Mass.

[21] Appl. No.: 217,127

[22] Filed: Mar. 24, 1994

Related U.S. Application Data

[63] Continuation of Ser. No. 649,844, Feb. 1, 1991, abandoned.

[51] Int. Cl.$^6$ ........................................... G06F 9/46
[52] U.S. Cl. ........................ 395/650; 364/DIG. 1; 364/281.3; 364/280; 364/242.1; 364/281.8
[58] Field of Search .................................. 395/200, 650, 395/230, 230.3, 700, 650

[56] References Cited

U.S. PATENT DOCUMENTS

| | | | |
|---|---|---|---|
| 3,702,006 | 10/1972 | Page | 444/1 |
| 4,318,174 | 3/1982 | Suzuki et al. | 364/200 |
| 4,387,427 | 6/1983 | Cox et al. | 364/200 |
| 4,394,727 | 7/1983 | Hoffman et al. | 364/200 |
| 4,432,051 | 2/1984 | Bogaert et al. | 364/200 |
| 4,638,427 | 1/1987 | Martin | 364/200 |
| 4,809,157 | 2/1989 | Eilert et al. | 364/200 |
| 4,868,739 | 9/1989 | Ngai et al. | 364/200 |
| 4,914,570 | 4/1990 | Peacock | 364/200 |
| 5,109,512 | 4/1992 | Bahr et al. | 395/650 |
| 5,185,861 | 2/1993 | Valencia | 395/200 |

OTHER PUBLICATIONS

"The Influence of Workload on Load Balancing Strategies" by Luis–Felipe Cabrera, IBM Res. Ctr., California.
Luis–Felipe Cabrera, "The Influence of Workload on Load Balancing Strategies," IBM Almaden Research Center, San Jose, California.
Derek L. Eager, Edward D. Lazowska and John Zahorjan, "Adaptive Load Sharing in Homogeneous Distributed Systems," *IEEE Transactions on Software Engineering*, vol. SE–12, No. 5, May 1986.

Primary Examiner—Kevin A. Kriess
Attorney, Agent, or Firm—Christensen, O'Connor, Johnson & Kindness

[57] ABSTRACT

A method of scheduling processes on a symmetric multiprocessing system that maintains process-to-CPU affinity without introducing excessive idle time is disclosed. When a new process is assigned, the process is identified as young and small, given a migtick value and assigned to a specific CPU. If the priority of a process placed on a run queue is above a threshold, the high priority count of the assigned CPU is incremented. At predetermined clock intervals, an interrupt occurs that causes the migtick value of running processes to be decremented. Then each CPU is tested to determine if its high priority count is greater than zero. CPUs having high priority counts greater than zero are tested to determine if any processes having a priority greater than the priority of the running process are assigned. If higher priority processes are assigned to a CPU having assigned processes lying above the threshold, a context switch takes place that results in the higher priority process being run. At regular intervals, a migration deamon is run to load balance the multiprocessor system. First, a large/small process threshold is determined. Then processes whose migtick values are below a migtick threshold (e.g., 0) are identified as old. Old processes then are identified as large or small processes based on their memory usage. Next, a determination is made of whether the small and large process load balances of the system can be improved. If either or both can be improved, the smallest small and/or the smallest large processes are migrated from their assigned CPU to the CPU with, as the case may be, the least large or the least small processes.

24 Claims, 8 Drawing Sheets

AFFINITY SCHEDULING OF PROCESSES ON SYMMETRIC MULTIPROCESSING SYSTEMS

This application is a continuation application based on prior application Ser. No. 07/649,844, filed on Feb. 1, 1991 now abandoned.

TECHNICAL AREA

This invention relates to the scheduling of processes to be run on central processing units (CPUs) and, more particularly, the scheduling of processes to be run on the CPUs of a symmetric multiprocessing system.

BACKGROUND OF THE INVENTION

In the past, processes to be run on multiprocessing systems, i.e., computer processing systems that include a plurality of central processing units (CPUs), have been scheduled on a common run queue. Every CPU in the multiprocessing system has equal access time to the run queue. When a CPU context change is required due, for example, to the time quantum of the current process expiring, the process being blocked by an I/O request, the CPU selects the process at the head of the run queue, placing the previously running process at the tail of the queue. This scheduling method works well for balancing the workload of a multiprocessor system wherein the majority of the system memory is global, equally available to all CPUs.

Recently, symmetric multiprocessing systems that include a substantial amount of coupled memory have been proposed. In a coupled memory multi-processing system, a memory module is associated, i.e., coupled, to each CPU. The CPU and the memory modules are interconnected via a global interconnect bus that is also connected to a larger global memory. Because all of the CPUs, all of the coupled memories and the global memory are interconnected via the global interconnect bus, all of system memory is available to all of the CPUs.

In addition to the global interconnect bus, the CPUs are coupled to their associated coupled memory via a private bus. As a result, any reference made by a CPU to its associated coupled memory does not have to use the global interconnect bus, except to the extent necessary to maintain memory coherency. Each memory reference that occurs as processes are being run on each CPU is checked to see if it maps to the coupled memory region associated with the CPU. If it does, the private bus is used. Otherwise, the global interconnect bus is used to access the required data from the global memory, or from the coupled memory associated with another CPU. Global interconnect bus bandwidth is saved when the CPU uses its coupled memory because the global interconnect bus is not used.

Because the random movement of processes from one CPU to another does not make the best use of a coupled memory system, a common run queue of the type used with previously developed symmetric multiprocessing systems is undesirable. More specifically, if processes are allowed to move freely from one CPU to another, the cost in interconnect bandwidth is great because all of the data and instructions located in the coupled memory must be moved as part of the process movement; or, the global interconnect bus must be used to access data and instructions in a coupled memory associated with a CPU other than the one running the process.

The present invention is directed to overcoming the foregoing and other problems by providing a method of scheduling processes on the CPUs of symmetric multiprocessing systems that maintain process-to-CPU affinity without introducing excessive idle time.

SUMMARY OF THE INVENTION

In accordance with this invention, a method of scheduling processes on a symmetric multiprocessing system that maintains process-to-CPU affinity without introducing excessive idle time is provided. When a new process is to be assigned to a CPU, the process is identified as young and small, given a migtick value and assigned to the next CPU according to a prescribed routine. While the presently preferred method of assigning a new process to a CPU is a round robin method, other methods ran be used. For example, a new process could be assigned to the CPU having the least number of "young" processes. Regardless of how assigned, the new process is placed on the assigned CPU's run queue associated with the priority of the new process. If the priority of the new process is above a predetermined threshold, the high priority count of the assigned CPU is incremented. Thereafter, whenever the process is removed from the run queue, if its priority still exceeds the threshold, the high priority count of the assigned CPU is decremented. If the process is returned to a run queue of the assigned CPU, the high priority count is again incremented provided the priority of the process remains above the threshold. At predetermined clock intervals, an interrupt occurs on each CPU that causes the migtick value of its running processes to be decremented. Then the interrupted CPU's high priority count is tested to determine if any high priority processes are assigned. If high priority processes are assigned to the interrupted CPU and at least one of the assigned processes has a higher priority than the current process, a context switch takes place that results in the highest priority process being run.

In accordance with other aspects of this invention, at regular intervals, a migration deamon is run to load balance the multiprocessing system. First, a large/small process threshold is determined. Then processes whose migtick values are below a migtick threshold (e.g., 0) are identified as old. Old processes are then designated large or small processes based on their memory requirements. Next, a determination is made of whether either the small or large process's load balance of the system can be improved. If either or both can be improved, the smallest small and/or the smallest large process assigned to the CPUs with the highest number of small/large processes are migrated from their assigned CPUs to the CPU with, as the case may be, the least number of large or the least number of small processes.

As will be readily appreciated from the foregoing summary, the invention provides a method of scheduling processes on a symmetric multiprocessing system that maintains process-to-CPU affinity except in situations where the system becomes substantially unbalanced. Because the system is designed to run the highest priority process assigned to each CPU, except in rare circumstances, high priority processes always remain assigned to the same CPU, i.e., they do not migrate. Rather, both large and small lower priority processes can migrate if system imbalance rises above a predetermined threshold level. As a result of process-to-CPU affinity, interaction with the global interconnect bus is minimized. Because high priority processes receive special treatment in the clock interrupt routine, the increase in system idle time associated with affinity-based scheduling is minimized. As a result, interconnect bandwidth cost is substantially less than with prior art systems that do not maintain process-to-CPU affinity.

BRIEF DESCRIPTION OF THE DRAWINGS

The foregoing and other advantages of the present invention will become more readily appreciated as the same becomes better understood by reference to the following detailed description when taken in conjunction with the accompanying drawings wherein.

DESCRIPTION OF THE PREFERRED EMBODIMENT

Figure 1:
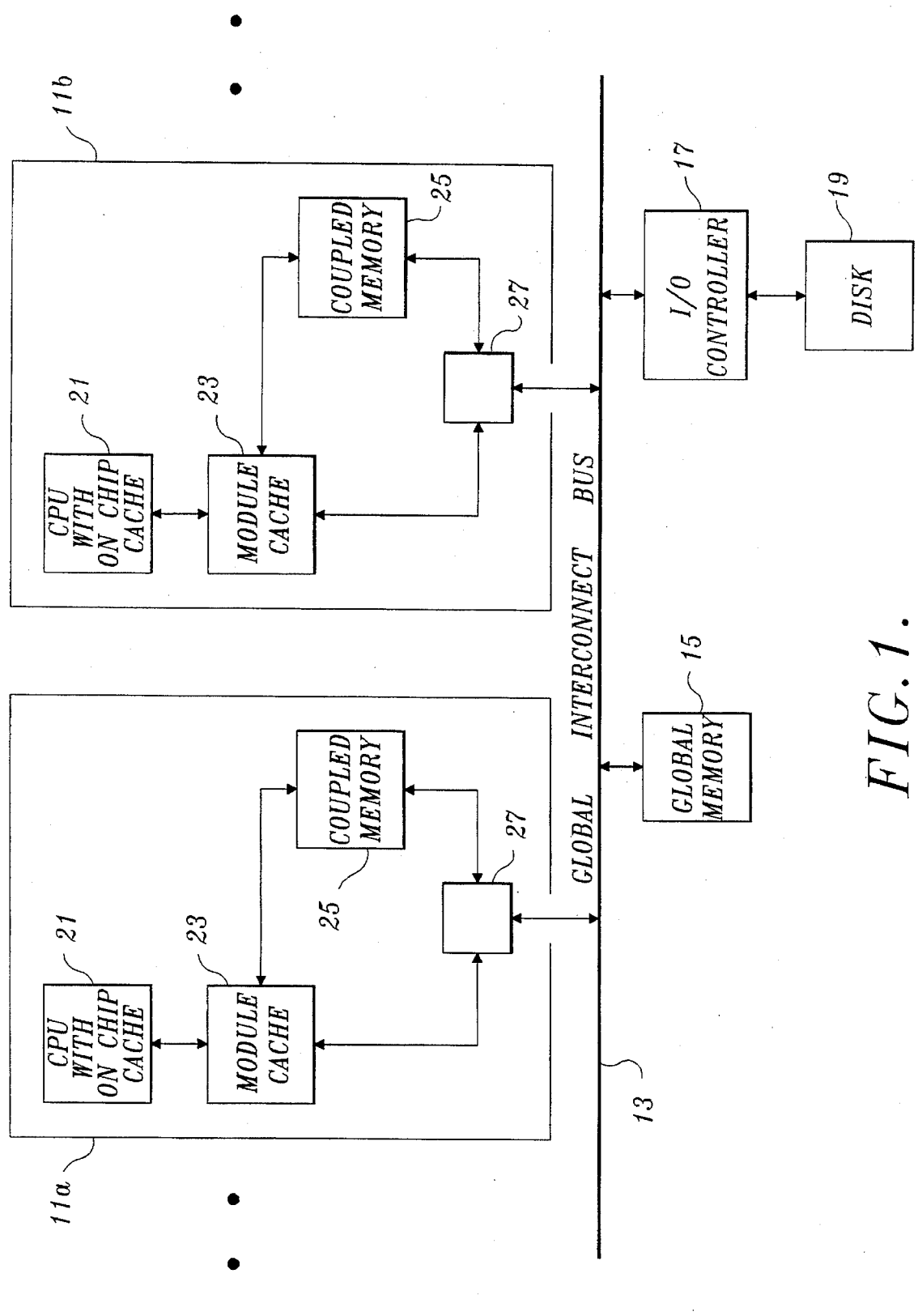
FIG. 1 is a pictorial diagram of a symmetric multiprocessing system with which the present invention is useful.

FIG. 1 illustrates a symmetric multiprocessing system of the type with which the invention is most useful. More specifically, the symmetric multiprocessing system illustrated in FIG. 1 comprises a plurality of identical or substantially identical CPU subsystems 11; a global interconnect bus 13; a global memory 15; an input/output (I/O) controller 17; and a permanent storage medium, such as a disk 19.

Each of the CPU subsystems includes: a CPU with an on-chip cache memory 21; a module cache memory 23; a coupled memory 25; and an input/output controller 27. The CPU 21 is coupled to the module cache memory 23. The module cache memory 23 is coupled both to a port of the coupled memory 25 and to the global interconnect bus 13 via the I/O controller 27. The I/O controller 27 also connects another port of the coupled memory 25 to the global interconnect bus 13. The global interconnect bus 13 is also coupled to the global memory 15, and to the disk 19 via the I/O controller 17.

As will be readily appreciated by those skilled in the art, from viewing FIG. 1 and the foregoing description, the multiprocessor system illustrated in FIG. 1 has five levels of memory hierarchy. The first level is the cache memory integrated with the CPU. This level has the shortest access latency. The next level in terms of access latency is the module cache memory 23. Level three is the coupled memory, which is also located near the CPU. The coupled memory 25 is considerably larger than the module cache memory 23. The global memory 15 is the traditional system memory in contemporary multiprocessor CPU systems. Level five is the storage disk 19. Because the coupled memory is directly coupled to its associated CPU, it can be accessed without using the services of the global interconnect bus 13. On the other hand, if one CPU needs data from the coupled memory of another CPU, it is available to the requiring CPU via the global interconnect bus. As a result, data, instructions, etc., stored in any of the memory is available to all of the CPUs.

The present invention is directed to providing a method of scheduling processes on the CPUs 21 of a symmetric multiprocessing system of the type illustrated in FIG. 1, that maintains process to CPU affinity without inducing excessive idle time. More specifically, the affinity scheduling method of the present invention is designed such that processes initially assigned a specific CPU 21 remain assigned to that CPU except in situations where memory requirements of the processes scheduled to be run on a particular CPU become excessive when compared to the memory requirements of processes scheduled to run on other CPUs. When such a load imbalance occurs, processes are migrated to less loaded CPUs. The smallest large or small processes above a particular process "age" are migrated. Maintaining process to CPU affinity in most instances and migrating the smallest processes minimizes global interconnect bus usage. More specifically, process to CPU affinity allows the most used items, such as data and stack pages, of the processes assigned to a specific CPU to be stored in the coupled memory. Less used items, such as instruction and shared memory pages, can be stored in the global memory. Because the information stored in a coupled memory is available to the associated CPU without use of the global interconnect bus, references to the coupled memory do not impact the bandwidth of the global interconnect bus.

Multiprocessing systems of the type illustrated in FIG. 1, as well as other multiprocessing systems, are, of course, controlled by an operating system. While the operating system can run on a CPU that is independent of the CPUs 21 used to carry out processes associated with applications programs, preferably one of the CPUs 21 is assigned the task of performing the functions of the operating system at system startup. Regardless of how the functions of the operating system are performed, the present invention, in essence, is a modification of the operating system designed to carry out the functions generally set forth above. Since the specific nature of the operating system can vary and does not form part of the present invention, a specific operating system is not described here. Rather, only the operating system modifications designed to carry out the present invention are described.

Figures 2, 3:
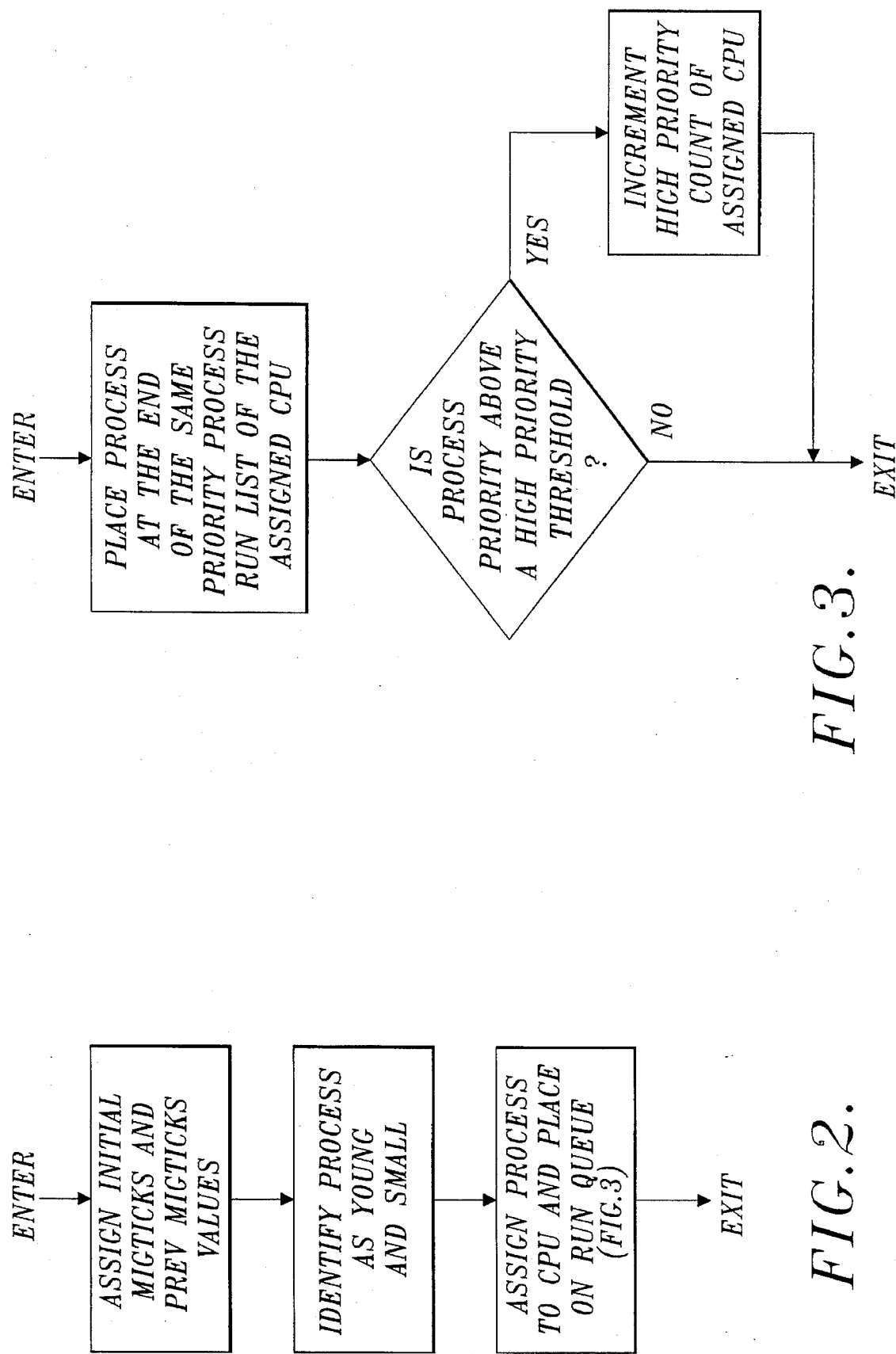
FIG. 2 is a flow diagram illustrating the steps that occur when a new process is assigned to a CPU.
FIG. 3 is a flow diagram illustrating the steps that occur when a process is added to the run queue of its assigned CPU.

FIG. 2 is a flow diagram illustrating the steps that occur when a new process is to be assigned to a CPU. Preferably, the steps occur in the process creation routine commonly employed by operating systems designed to control the operation of a symmetric multiprocessing system of the type illustrated in FIG. 1, such as in the fork routine of the Ultrix operating system designed to run a conventional Quad-CPU VAX6300 system produced by the Digital Equipment Corporation. After performing normal fork routine steps, as shown in FIG. 2, the new process is assigned initial migticks and previous (prev) migtick values. The same number is assigned to both values. As described below, the migtick value assigned to a process is decremented when the process is run. During load balancing the migticks and previous migtick values are used to determine whether a process is young or old and, thus, available or unavailable for migration.

After migticks and prev migtick values are assigned, a new process is identified as a process that is both young and small. The process is assigned to a CPU and placed on the run queue of the assigned CPU. The CPU assignment can be made in various ways. The present preferred way is to use a round robin method of assignment wherein the next CPU in the round robin sequence is automatically assigned the next new process. An alternative way is to keep track of the number of processes assigned to each CPU and assign a new process to the CPU with the lowest number of processes. A further way is to keep track of the memory requirements of each process as it is assigned and assign new processes to the CPU with the processes having the lowest memory requirements.

The preferred way of placing newly assigned processes on the run queue of their assigned CPU is illustrated in FIG. 3. First the process is checked to determine its priority. Based on its priority, the process is placed on the same priority process run list of the assigned CPU. More specifically, prior to being assigned, each new process is given a priority value. The priority value is usually determined by the nature of the process. High priority processes tend to be I/O-active processes that require little compute time. System throughput is best served by causing these I/O activities to run in parallel with compute-bound tasks. In any event, after the process is placed at the end of the same priority process run list of the assigned CPU, the priority of the process is checked to determine if it is above a high priority threshold level. If the priority of the process is above a high priority threshold level, the high priority count of the assigned CPU is incremented. After the high priority count of the assigned CPU has been incremented, if required, or if the process is below the high priority threshold, the program exits the process assignment subroutine illustrated in FIG. 3.

Figure 4:
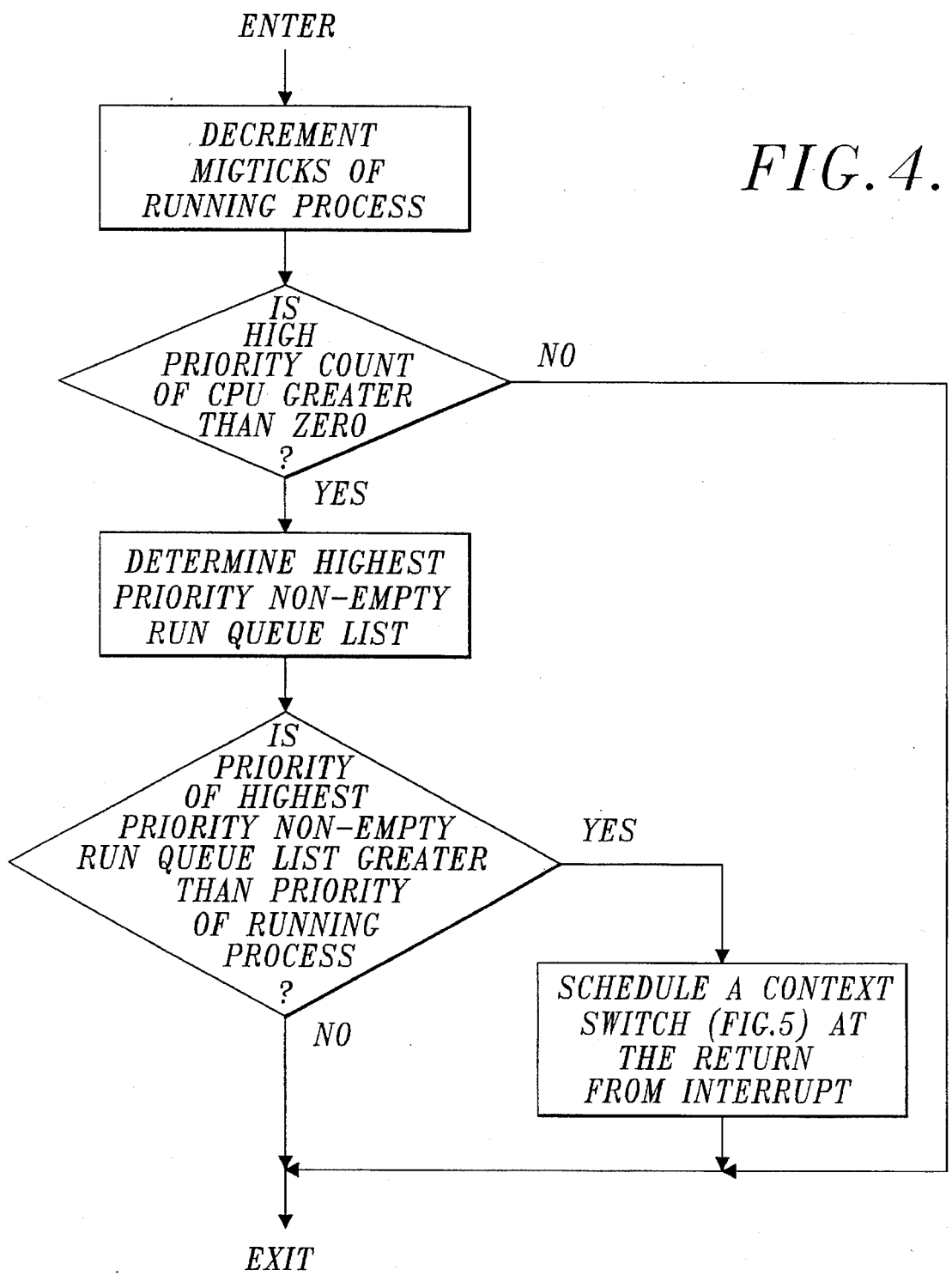
FIG. 4 is a flow diagram illustrating the steps that take place when a clock interrupt occurs.

At predetermined periods of time, the clock of a CPU generates a clock interrupt that causes that CPU to make a pass through the clock interrupt subroutine illustrated in FIG. 4. Typically, the CPU interval clocks on multi-CPU systems are not synchronized. Each CPU executes the clock interrupt subroutine when its clock generates an interrupt.

The first step in the clock interrupt subroutine is to decrement the migtick value of the process running on the related CPU. Then a test is made to determine if the high priority count of the CPU is greater than zero (0), i.e., if any high priority processes are assigned to the CPU. If no high priority counts are assigned to the related CPU, the program exits the clock interrupt subroutine. If the high priority count of the CPU is greater than zero (0), the highest priority non-empty run queue list is determined. Then a test is made to determine if the priority of the highest priority non-empty run queue list is greater than the priority of the running process. If the priority of the highest priority non-empty run queue list is greater than the priority of the running process, a context switch is scheduled to occur at the next return from interrupt. After the context switch has been scheduled or if the priority of the highest priority non-empty run queue list is less than the priority of the running process, the program exits the clock interrupt subroutine. As will be better understood from the following description, the context switch results in the process having the highest priority running on each CPU.

Figure 5:
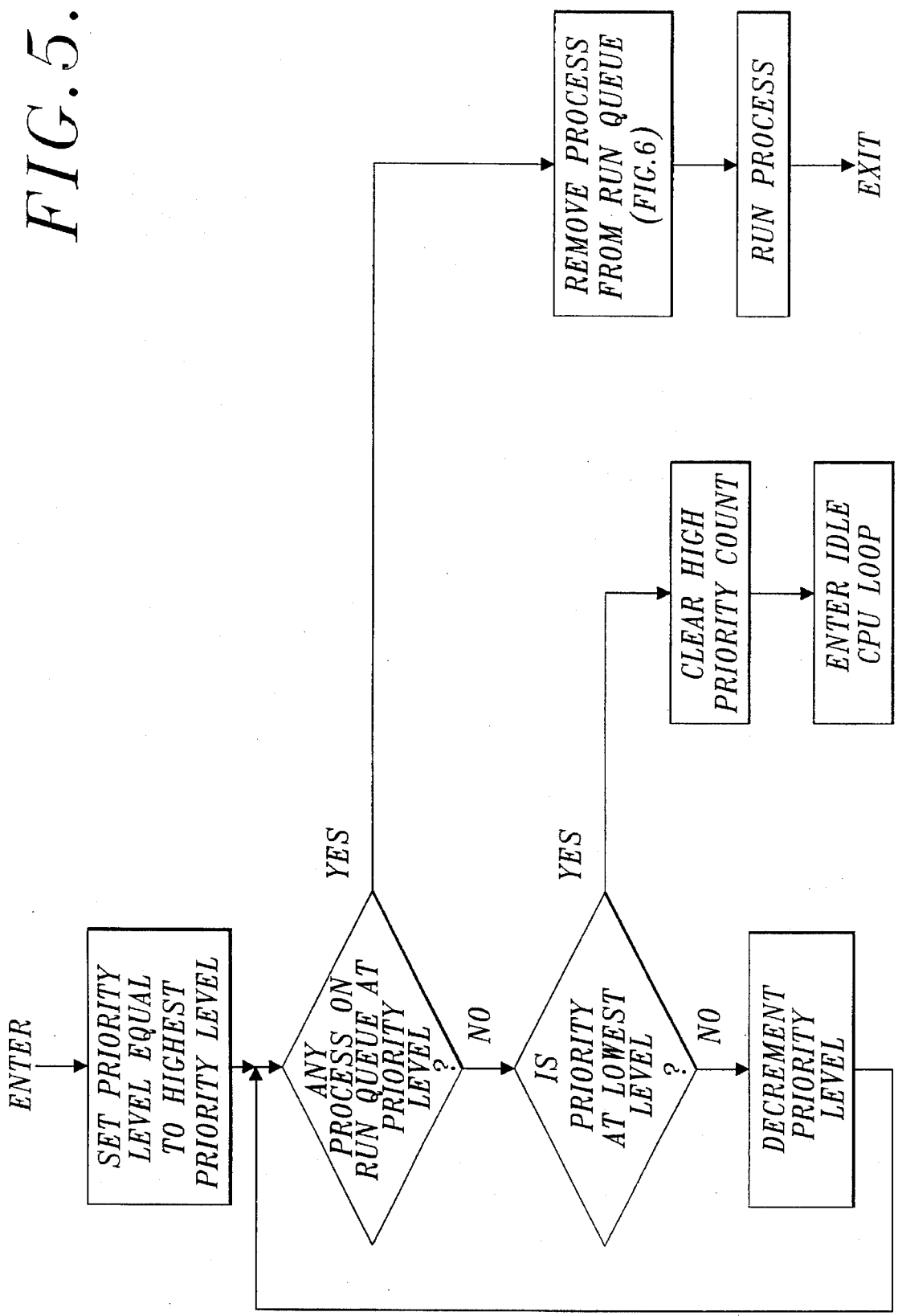
FIG. 5 is a flow diagram illustrating the steps of a context switch subroutine suitable for use in the flow diagram illustrated in FIG. 4, and in other flow diagrams.

FIG. 5 is a flow diagram that illustrates the steps of a context switch subroutine suitable for use in the clock interrupt subroutine illustrated in FIG. 4. Prior to entering the context switch subroutine illustrated in FIG. 5, any process running on the CPU whose context is to be switched is idled. Depending upon the nature of the process, the context of the process is saved and the process is placed on the run queue list having the appropriate priority or on a sleep queue, as appropriate. In any event, after any running process has been idled, the value of a variable called the priority level is set equal to the highest priority level that any process could be assigned. Next, a test is made to determine if there are any processes on the run queue at the priority level setting. If a process is in the run queue at the priority level setting, the first process on the run queue having this priority level is removed from the run queue, preferably in the manner illustrated in FIG. 6 and described below, and run. Thereafter, the program exits the context switch subroutine. If no process is on the run queue at the priority level setting, a test is made to determine if the priority level setting is at the lowest level that any process could be assigned. If not, the priority level setting is decremented. Thereafter, a test is made to determine if any process is on the run queue at the new priority level setting and the other previously described steps are repeated. If the priority level setting is at the lowest priority level that any process could be assigned, the high priority count of the related CPU is cleared and the CPU enters an idle loop. The "clear high priority count" step is, of course, a protective step since the high priority count should have been cleared if no processes are on any of the run lists of the CPU.

Figure 6:
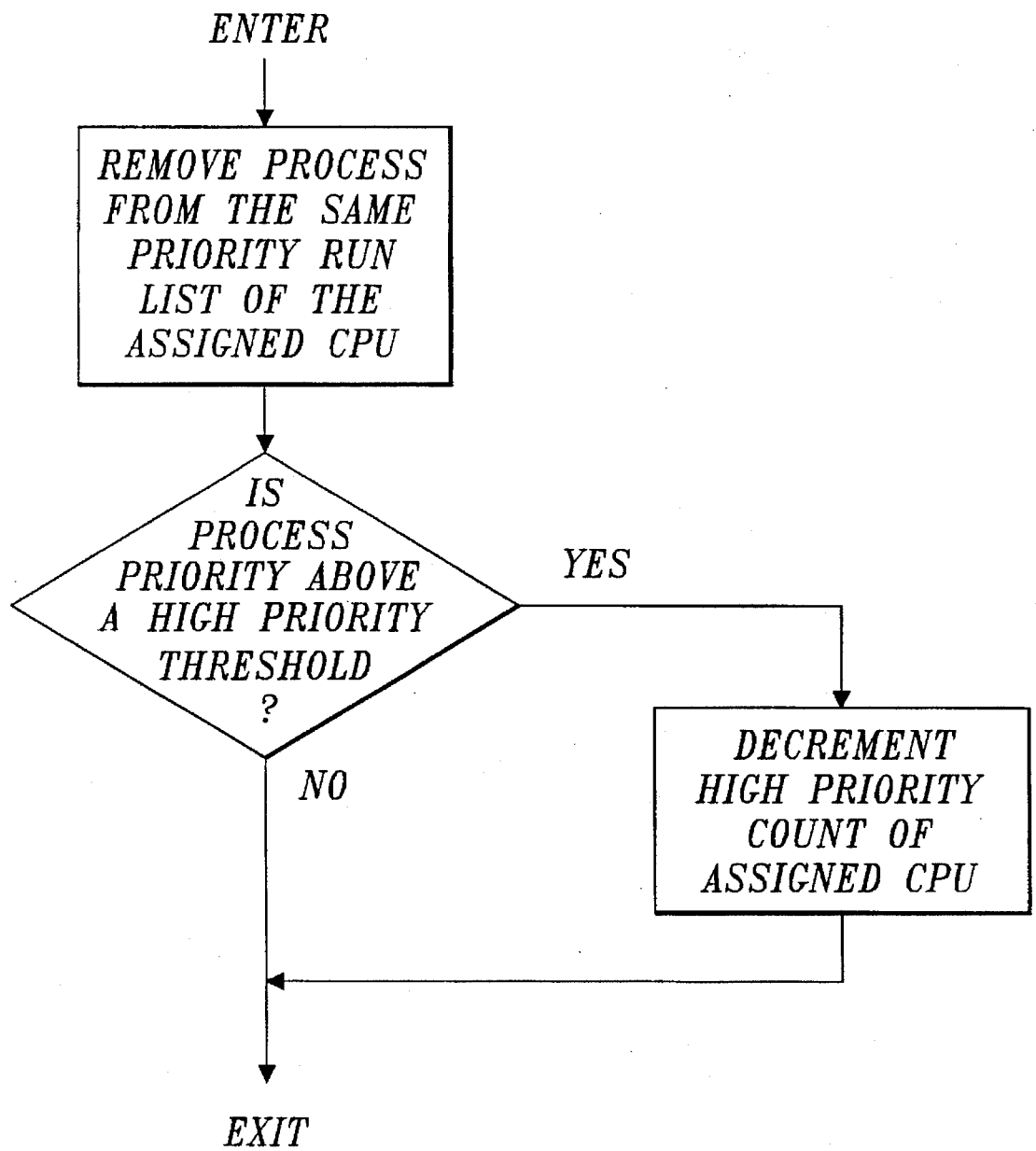
FIG. 6 is a flow diagram illustrating the steps that occur when a process is removed from the run queue of a CPU.

FIG. 6 illustrates the steps that occur when a process is removed from a CPU. First, the process is removed from the same priority run queue list of the assigned CPU. Then a test is made to determine if the priority of the process is above the high priority threshold. If the priority of the process that was removed is above the high priority threshold, the high priority count of the previously assigned CPU is decremented. After the high priority count has been decremented or if the priority of the removed process is not above the high priority threshold, the program exits the process removal subroutine illustrated in FIG. 6.

Figure 7:
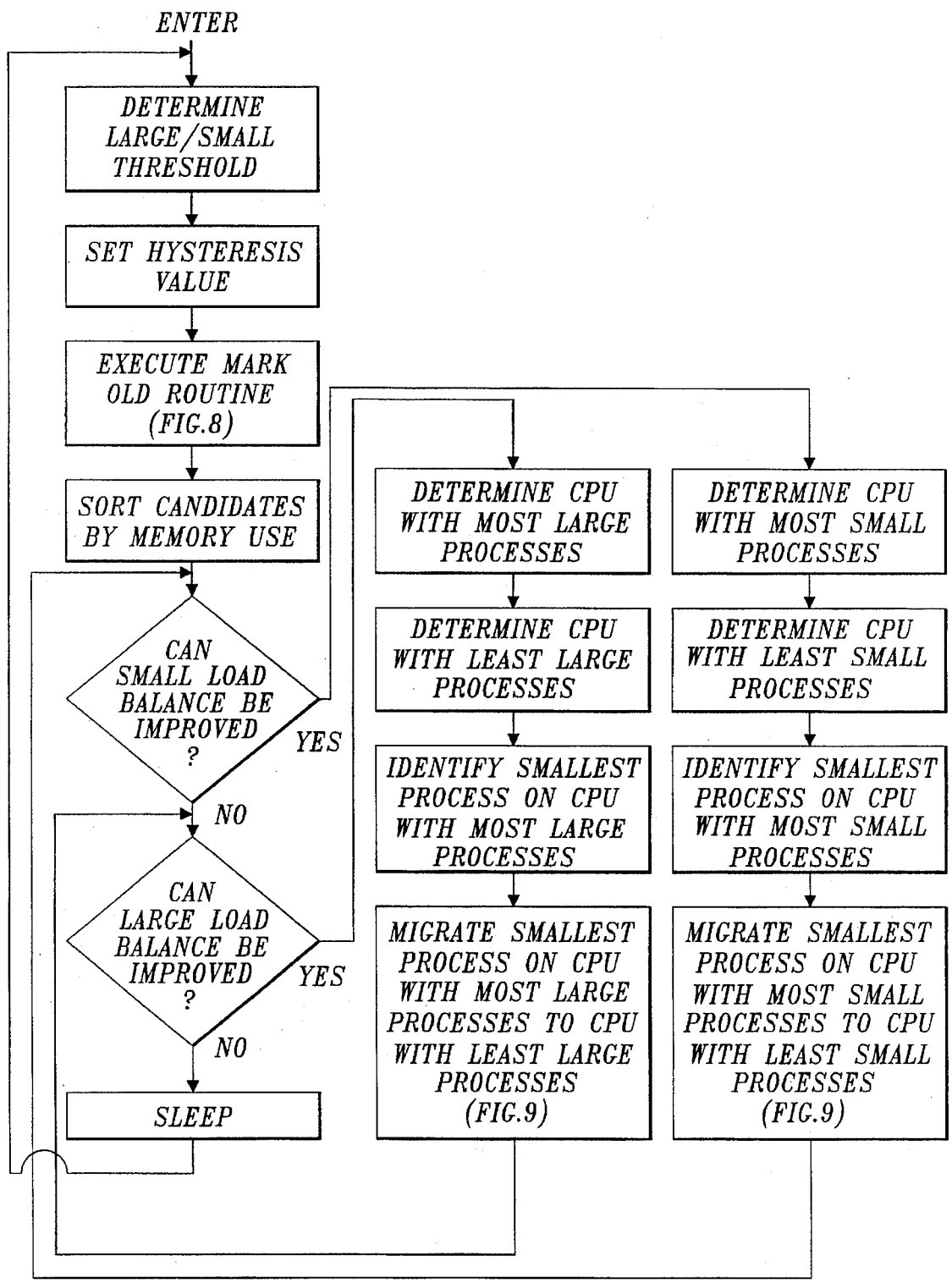
FIG. 7 is a flow diagram illustrating the steps that take place when the migration deamon is run.

FIG. 7 illustrates the steps of a migration deamon subroutine run by the operating system at regular intervals that controls the migration of large and small processes from one CPU to another when the overall system becomes unbalanced. The system is considered to be unbalanced when the number of large processes (based on memory requirements) assigned to one CPU is larger by a specific factor than the number of large processes assigned to other CPUs or when the number of small processes (again based on memory requirements) assigned to one CPU is larger by a specific factor than the number of small processes assigned to other CPUs.

The first step in the migration deamon subroutine is to determine a large/small threshold value. While the large/small threshold, i.e., the dividing line between large and small processes, can be determined in various ways, preferably, the threshold or dividing line is determined by dividing the size of the total amount of coupled memory by the total number of processes in the run queues of all of the CPUs. Processes having memory requirements greater than the resulting value are considered to be large processes and processes having memory requirements below the threshold value are considered to be small processes. Next a hysteresis value is set. The hysteresis value prevents processes lying near the "dividing line" from moving between classifications, i.e., the hysteresis value provides stability by preventing processes from bouncing between classifications just by releasing or reallocating relatively small amounts of memory.

Figure 8:
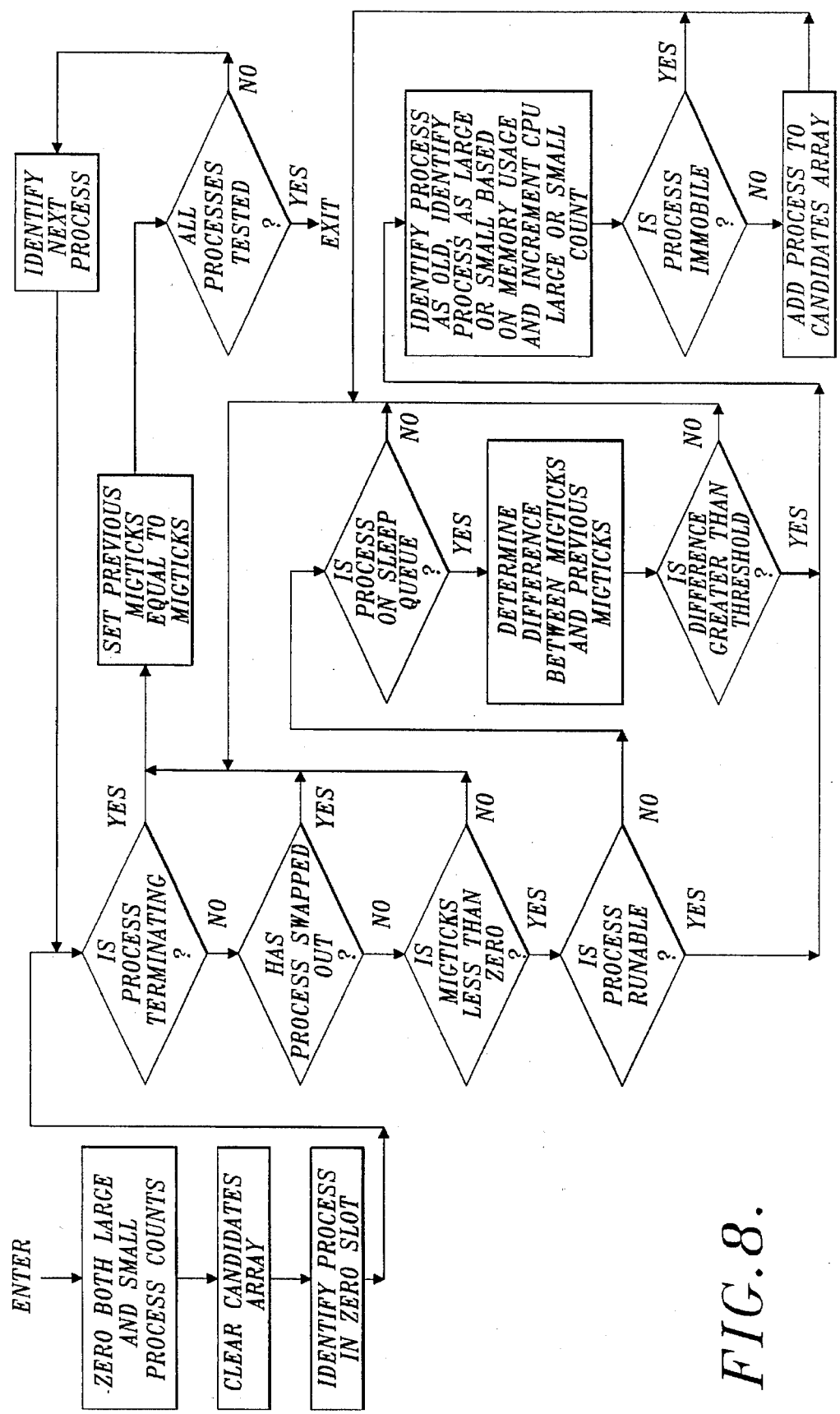
FIG. 8 is a flow diagram illustrating the steps of a mark old subroutine suitable for use in the migration deamon illustrated in FIG. 7.

Next, a pass is made through a mark old routine, which is illustrated in FIG. 8 and described below. The mark old routine determines which processes assigned to each CPU are young and which processes are old. After the young/old process determination is made, all of the old processes are sorted by memory use, i.e., they are sorted and identified as large or small processes based on whether their memory requirements lie above or below the previously determined large/small threshold. Then a test is made to determine if the small process load balance can be improved. This is accomplished by determining if one CPU has at least two or more small old processes than any other CPU.

Figure 9:
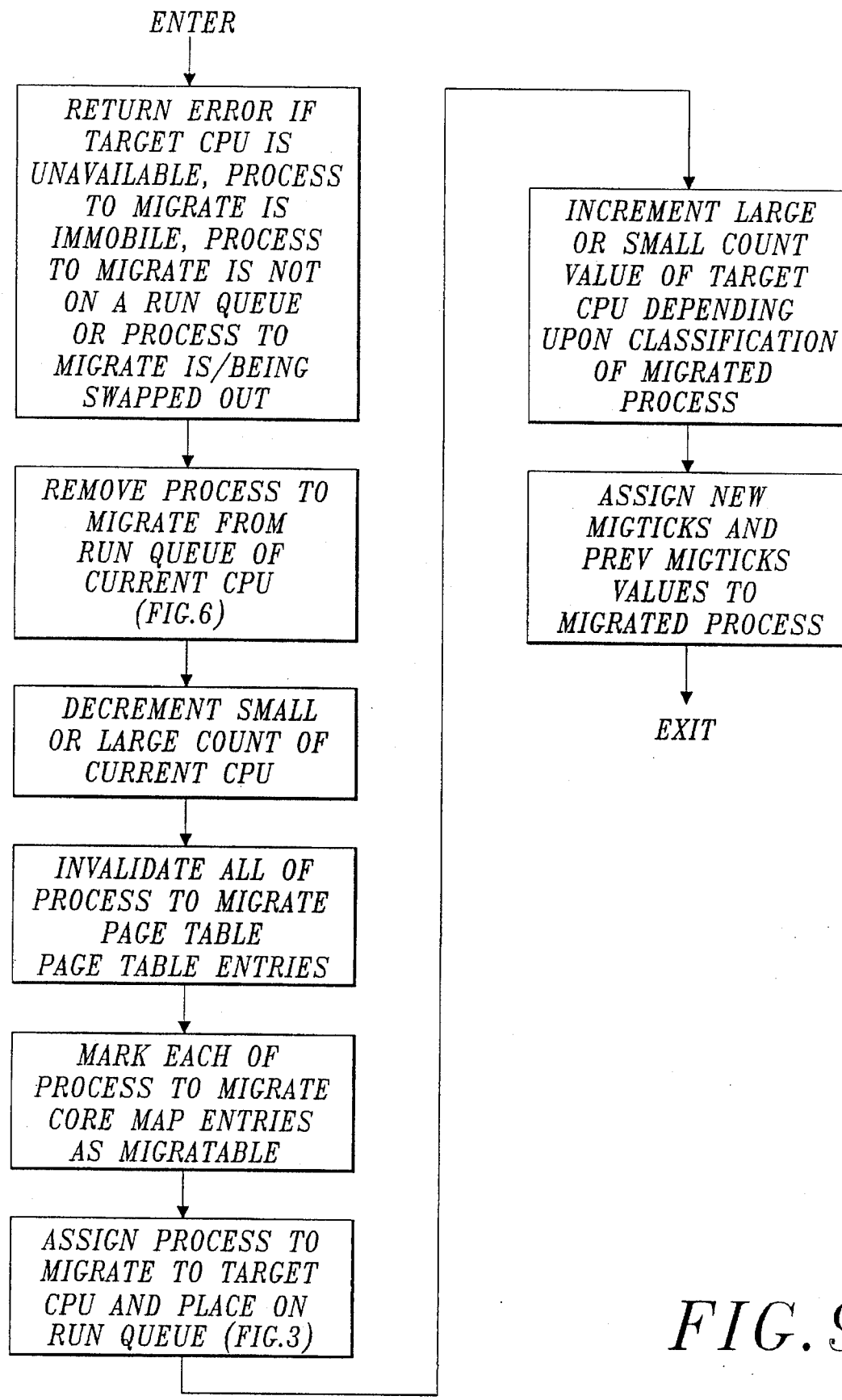
FIG. 9 is a flow diagram illustrating the steps that occur when a process is migrated from one CPU to another.

If the small load balance can be improved, the CPU with the most small processes is determined. Then, the CPU with the least small processes is determined. Next, the smallest small process on the run queue of the CPU with the most small processes is identified. Thereafter, the smallest process on the CPU with the most small processes is migrated to the CPU with the least small processes. A suitable migration subroutine is illustrated in FIG. 9 and described below. Next, the "can small load balance be improved" test is repeated. If the small load balance can be further improved, the foregoing sequence of steps is repeated.

If the small load balance cannot be improved, which means that no CPU has at least two or more small old processes than any other CPU, a test is made to determine if the large load process balance can be improved. Like the small load process balance improvement test, the large load balance improvement test is accomplished by determining if any one CPU has at least two or more large old processes than any other CPU.

If the large load balance can be improved, the CPU with the most large processes is determined. Then, the CPU with the least large processes is determined. Next, the smallest large processes on the CPU with the most large processes is determined. Then, the smallest large process on the CPU with the most large processes is migrated to the CPU with the least large processes. A suitable migration subroutine is illustrated in FIG. 9 and described below. Next, the "can large load balance be improved" test is repeated. If the large-load balance can be further improved, the foregoing sequence of steps is repeated. If the large-load balance cannot be improved, the migration deamons subroutine is placed in a quiescent, i.e., sleep, mode state. The migration deamon subroutine remains in a sleep state until reactivated by the operating system to reevaluate the load balance of the symmetric multiprocessing system.

As noted above, FIG. 8 illustrates a mark old subroutine suitable for use in the migration deamon subroutine illustrated in FIG. 7 and described above. The first step in the mark old subroutine is to zero both the large and small process counts of all related CPUs. Next, a list or array of migration candidates is cleared. Then, the process in the zero slot of the list of all of the processes in the entire system is determined. Then, a test is made to determine if the process is terminating. If the process is terminating, the prev migtick value of the process is set equal to the current migtick value of the process. Then, a test is made to determine if all processes have been tested to determine if they are young or old. If all processes have not been tested, the next process is identified and the "is process terminating" test is repeated. If all processes have been tested to determine if they are young or old, the mark old subroutine exits.

If the process is not terminating, a test is made to determine if the process has swapped out. As will be recognized by those skilled in the art of virtual memory systems, a process is swapped out of physical memory (and stored on disk) when the demand for physical memory exceeds a predetermined level. If the process has swapped out, the previous migtick value is set equal to the current migtick value. Then, the "all processes tested" step takes place.

As will be better understood from the following description, the previous migtick value is not subsequently used for processes that are terminating or those that have been swapped out. As a result, the "set previous migticks equal to migticks" step could be by-passed after the "is process terminating" and "has process swapped out" tests, if desired. The step is included simply because, as will be better understood from the following description, the step lies in a common path to the "all processes tested" step followed by other branches of the mark old subroutines illustrated in FIG. 8.

If the process has not been swapped out, a test is made to determine if the migtick value associated with the process being tested is less than zero. If migticks is not less than zero, previous migticks is set equal to the present migtick value. Then the "all processes tested" step is performed.

If migticks is less than zero, a test is made to determine if the process is runable. If the process is runable, the process is identified as old. The process is also identified as large or small, based on memory usage. Based on the large/small determination, the large or small count of the related CPU is incremented.

Next, a test is made to determine if the process is immobile. Immobile processes are special processes created during system startup. For one reason or another, they are immune from migration. If the process is immobile, previous migticks is set equal to the current migtick value and the "all processes tested" step occurs. If the process is not immobile, the process is added to the array of candidates available for migration. Then previous migticks is set equal to the current migtick value, followed by the "all processes tested" step.

If the process is not runable, a test is made to determine if the process is on the sleep queue. Processes are on the sleep queue if they are waiting some action, such as the receipt of data from disk storage or completion of another process, before they can be run. When the action occurs, they awake and become available to be run. If the process is not on the sleep queue, previous migticks is set equal to the current migtick value, followed by the "all processes tested" step.

If the process is on the sleep queue, the difference between previous migticks and the current value of migticks is determined. Then a test is made to determine if the difference is greater than a predetermined threshold. This test determines if the process has run for more than an insignificant period of time since the last time the migration deamon subroutine was run. If the difference is less than the threshold, previous migticks is set equal to the current migtick value, followed by the "all processes tested" step. If the difference is greater than the threshold, the process is identified as old (because migticks was found to be less than zero) and large or small based on memory usage. Based on the large/small determination, the large or small process count of the related CPU is incremented. Thereafter, the "is process immobile" test is performed, followed by the other mark old subroutine steps previously described.

In summary, the mark old subroutine identifies as old runable processes whose migtick values are less than zero, provided the processes are not being removed or have not been swapped out. Processes with migtick values less than zero that are not runable, i.e., are on the sleep queue, are identified as old, provided they have been run for more than a minimal period of time since the last time the migration deamon subroutine was run. Processes identified as old are categorized on the basis of whether they are large or small and, if not immobile, are added to an array of processes available for migration.

As noted above, FIG. 9 is a flow diagram of a migration subroutine suitable for use in the migration deamon subroutine illustrated in FIG. 7 and described above. The first step in the migration subroutine is to return an error if the target CPU is unavailable, the process to migrate is designated immobile, the process to migrate is not on a run queue, or the process to migrate is being swapped out, because under many of these conditions the process cannot migrate. More specifically, if the target CPU is unavailable to receive a process, obviously, the process cannot migrate to that CPU. If the process to migrate is designated as immobile, i.e., the process has been designated to run on one and only one CPU, it cannot migrate. As noted above, such processes are normally special processes created during system startup. This step is a back-up to the mark old subroutine since immobile processes should not be listed on the array of candidates available for migration. If the process designated to migrate is not on a run queue, or has been or is being swapped out, it cannot migrate.

If the process designated to migrate can migrate, it is removed from the run queue of its current CPU. Next, the small or large count, as the case may be, of the current CPU is decremented. Then, all of the page table and page table entries of the process designated to migrate are invalidated. Next, each of the core map entries of the process designated to migrate are marked as migratable. Thereafter, the process designated to migrate is assigned to its target CPU and added to the run queue of the target CPU by making a pass through the add process subroutine illustrated in FIG. 3 and described above. Next, depending on whether the migrating process is large or small, the large or small count value of the target CPU is incremented. Finally, new migticks and previous migtick values are assigned to the migrated process. New values are assigned so the process will not become available to migrate the next time the migration deamon subroutine is run.

As will be readily appreciated from the foregoing description, the invention provides a method of scheduling processes on a symmetric multiprocessing system that maintains process-to-CPU affinity without introducing excessive idle time. When a new process is to be assigned, it is identified as young and small, given a migtick value, and assigned to a CPU. If the priority of the process is above a predetermined threshold, the high priority count of the assigned C PU is incremented. At predetermined clock intervals, an interrupt occurs that causes the migtick values of running processes to be decremented. Then each CPU's high priority count is tested to determine if any higher priority processes are assigned. If higher priority processes are assigned to a CPU, a context switch takes place that results in the higher priority process being run. At regular intervals, a migration deamon is run to load balance the multiprocessing system. First, a large/small process threshold is determined. Then processes whose migtick values are below a migtick threshold (e.g., 0) are identified as old. Old processes are then designated large or small, depending on their memory requirements. Next, a determination is made of whether the small and large process load balances of the system can be improved. If either or both can be improved, the smallest small and/or the smallest large processes are migrated from their assigned CPUs to target CPUs with, as the case may be, the least large or the least small processes.

While a preferred embodiment of the invention has been illustrated and described, it will be appreciated that, within the scope of the appended claims, various changes can be made therein. For example, although load balancing has been discussed in terms of only two process sizes, large and small, it is to be understood that a range of sizes, ten, for example, could be used for load balancing. That is, load balancing could take place when a sufficient imbalance exists in any size of the range.

The embodiments of the invention in which an exclusive property or privilege is claimed are defined as follows:

1. A method of affinity scheduling and context switching processes to be run on the CPUs of a multiprocessing system, said method comprising the steps of:

(a) assigning new processes to the CPUs of a multiprocessing system in accordance with a predetermined routine to create an initial affinity between said new processes and the CPUs to which said new processes are assigned, each of said processes having a priority value for context switching purposes whose magnitude is based on the nature of the process;

(b) interrupting the processes running on the CPUs of said multiprocessing system at regular clock intervals;

(c) during an interrupt, for each CPU interrupted, determining if any assigned processes having a priority value above a predetermined assigned process threshold are assigned to the CPU;

(d) during said interrupt or a subsequent interrupt, for each CPU interrupted having assigned processes with a priority value above said predetermined assigned process threshold, determining if any process assigned to the CPU has a priority value that is higher than said predetermined assigned process threshold and higher than the priority value of the process running when the CPU was interrupted; and (e) upon returning from said interrupt, switching the context of the process running on each CPU having an assigned process with a priority value above said predetermined assigned process threshold whose priority value is higher than said predetermined assigned process threshold and higher than the priority value of the process running when the CPU was interrupted to the process having the higher priority value.

2. A method of affinity scheduling and context switching process to be run on the CPUs of a multiprocessing system, said method comprising the steps of:

(a) assigning new processes to the CPUs of a multiprocessing system in accordance with a predetermined routine to create an initial affinity between said new processes and the CPUs to which said new processes are assigned, each of said processes having a priority value for context switching purposes whose magnitude is based on the nature of the process;

(b) assigning a comparable migtick value to each new process as it is assigned to a CPU;

(c) interrupting the process running on the CPUs of said multiprocessing system at regular clock intervals;

(d) during an interrupt for each CPU interrupted, determining if processes having a priority value above a predetermined threshold are assigned to the CPU;

(e) during said interrupt or a subsequent interrupt, for each CPU interrupted having assigned process with a priority value above said predetermined threshold, determining if any process assigned to the CPU has a priority value that is higher than said predetermined threshold and higher than the priority value of the process running when the CPU was interrupted;

(f) upon returning from said interrupt, switching the context of the process running on each CPU having an assigned process with a priority value above said predetermined threshold whose priority value is higher than said predetermined threshold and higher than the priority value of the process running when the CPU was interrupted to the process having the higher priority value;

(g) during said interrupt, decrementing the migtick value of the processes that were running on said interrupted CPUs when said interrupted occurred; and (h) after new processes have been assigned a migtick value, performing migration deamon steps at predetermined intervals to load balance said multiprocessing system, said migration deamon steps comprising:

(1) determining whether processes assigned to the CPUs of said multiprocessing system are young or old based on the migtick values of the processes when the migration deamon is run, wherein processes whose migtick values are below a predetermined migtick threshold are identified as old;

(2) determining if the load balance of the multiprocessing system is unbalanced based on a predetermined criterion; and (3) improving the load balance of said multiprocessing system if said multiprocessing system is unbalanced by migrating old processes from the CPUs having the most assigned old processes to the CPUs having the least assigned old processes.

3. The method claimed in claim 2 wherein said predetermined criterion is based on the memory requirements of the processes assigned to the CPUs of said multiprocessing system.

4. The method claimed in claim 3 wherein said old processes are sorted into large and small processes based on the memory requirements of said processes prior to determining if the load balance of the multiprocessing system is unbalanced.

5. The method claimed in claim 4 wherein the step of determining if the load balance of the multiprocessing system is unbalanced comprises the substeps of determining if the small process load balance of the multiprocessing system can be improved and if the large process load balance of the multiprocessing system can be improved; and wherein the step of improving the load balance of the multiprocessing system comprises migrating old small processes from the CPUs having the most assigned old small processes to the CPUs having the least assigned old small processes and migrating old large processes from the CPUs having the most assigned old large processes to the CPUs having the least assigned old large processes.

6. The method claimed in claim 5 wherein the smallest old small process is the first of the old small processes to be migrated and wherein the smallest old large process is the first of the old large processes to be migrated.

7. The method claimed in claim 1 wherein the predetermined routine used to assign new processes to the CPUs of a multiprocessing system is a round robin routine wherein the next new process is assigned to the next CPU in the round robin routine in a sequential manner.

8. A method of affinity scheduling and context switching processes to be run on the CPUs of a multiprocessing system, said method comprising the steps of:

(a) assigning new processes to the CPUS of a multiprocessing system in accordance with a round robin routine wherein the next new process is assigned to the next CPU in the round robin routine in a sequential manner to create an initial affinity between said new processes and the CPUs to which said new processes are assigned, each of said processes having a priority value for context switching purposes whose magnitude is based on the nature of the process;

(b) assigning a comparable migtick value to each new process as it is assigned to a CPU;

(c) interrupting the processes running on the CPUs of said multiprocessing system at regular clock intervals;

(d) during an interrupt, for each CPU interrupted, determining if processes having a priority value above a predetermined threshold are assigned to the CPU;

(e) during said interrupt or a subsequent interrupt, for each CPU interrupted having assigned processes with a priority value above said predetermined threshold, determining if any process assigned to the CPU has a priority value that is higher than said predetermined threshold and higher than the priority value of the process running when the CPU was interrupted;

(f) upon returning from said interrupt, switching the context of the process running on each CPU having an assigned process with a priority value above said predetermined threshold whose priority value is higher than said predetermined threshold and higher than the priority value of the process running when the CPU was interrupted to the process having the higher priority value;

(h) after new processes have been assigned a migtick value, performing migration deamon steps at predetermined intervals to load balance said multiprocessing system, said migration deamon steps comprising:

(1) determining whether processes assigned to the CPUs of said multiprocessing system are young or old based on the migtick values of the processes when the migration deamon is run, wherein processes whose migtick values are below a predetermined migtick threshold are identified as old;

(2) determining if the load balance of the multiprocessing system is unbalanced based on a predetermined criterion; and (3) improving the load balance of said multiprocessing system if said multiprocessing system is unbalanced by migrating old processes from the CPUs having the most assigned old processes to the CPUs having the least assigned old processes.

9. The method claimed in claim 8 wherein said predetermined criterion is based on the memory requirements of the processes assigned to the CPUs of said multiprocessing system.

10. The method claimed in claim 9 wherein said old processes are sorted into large and small processes based on the memory requirements of said processes prior to determining if the load balance of the multiprocessing system is unbalanced.

11. The method claimed in claim 10 wherein the step of determining if the load balance of the multiprocessing system is unbalanced comprises the steps of determining if the small process load balance of the multiprocessing system can be improved and if the large process load balance of the multiprocessing system can be improved; and wherein the step of improving the load balance of the multiprocessing system comprises migrating old small processes from the CPUs having the most assigned old small processes to the CPUs having the least assigned old small processes and migrating old large processes from the CPUs having the most assigned old large processes to the CPUs having the least assigned old large processes.

12. The method claimed in claim 11 wherein the smallest old small process is the first of the old small processes to be migrated and wherein the smallest old large process is the first of the old large processes to be migrated.

13. A method of affinity scheduling processes to be run on the CPUs of a multiprocessing system, said method comprising the steps of:
  (a) assigning new processes to the CPUs of a multiprocessing system in accordance with a predetermined routine;
  (b) assigning a comparable migtick value to each new process as it is assigned;
  (c) interrupting the process running on the CPUs of said multiprocessing system at regular clock intervals;
  (d) during an interrupt, decrementing the migtick values of the processes that were running on said interrupted CPUs when said interrupt occurred; and
  (e) after new processes have been assigned a migtick value, performing migration deamon steps at predetermined intervals to load balance said multiprocessing system, said migration deamon steps comprising:
    (1) determining whether processes assigned to the CPUs of said system are young or old based on their migtick values when the migration deamon is run, wherein processes whose migtick values are below a predetermined migtick threshold are identified as old;
    (2) determining if the load balance of the multiprocessing system is unbalanced based on a predetermined criterion; and
    (3) improving the load balance of said multiprocessing system if said multiprocessing system is unbalanced by migrating old processes from the CPUs having the most assigned old processes to the CPUs having the least assigned old processes.

14. The method claimed in claim 13 wherein said predetermined criterion is based on the memory requirements of the processes assigned to the CPUs of said multiprocessing system.

15. The method claimed in claim 14 wherein said old processes are sorted into large and small processes based on the memory requirements of said processes prior to determining if the load balance of the multiprocessing system is unbalanced.

16. The method claimed in claim 15 wherein the step of determining if the load balance of the multiprocessing system is unbalanced comprises the steps of determining if the small process load balance of the multiprocessing system can be improved and if the large process load balance of the multiprocessing system can be improved; and wherein the step of improving the load balance of the multiprocessing system comprises migrating old small processes from the CPUs having the most assigned old small processes to the CPUs having the least assigned old small processes and migrating old large processes from the CPUs having the most assigned old large processes to the CPUs having the least assigned old large processes.

17. The method claimed in claim 16 wherein the smallest old small process is the first of the old small processes to be migrated and wherein the smallest old large process is the first of the old large processes to be migrated.

18. The method claimed in claim 13 wherein the predetermined routine used to assign new processes to the CPUs of a multiprocessing system is a round robin routine wherein the next new process is assigned to the next CPU in the round robin routine in a sequential manner.

19. The method claimed in claim 18 wherein said predetermined criterion is based on the memory requirements of the processes assigned to the CPUs of said multiprocessing system.

20. The method claimed in claim 19 wherein said old processes are sorted into large and small processes based on the memory requirements of said processes prior to determining if the load balance of the multiprocessing system is unbalanced.

21. The method claimed in claim 20 wherein the step of determining if the load balance of the multiprocessing system is unbalanced comprises the steps of determining if the small process load balance of the multiprocessing system can be improved and if the large process load balance of the multiprocessing system can be improved; and wherein the step of improving the load balance of the multiprocessing system comprises migrating old small processes from the CPUs having the most assigned old small processes to the CPUs having the least assigned old small processes and migrating old large processes from the CPUs having the most assigned old large processes to the CPUs having the least assigned old large processes.

22. The method claimed in claim 21 wherein the smallest old small process is the first of the old small processes to be migrated and wherein the smallest old large process is the first of the old large processes to be migrated.

23. The method in claim 2, wherein when said old processes are migrated, the migtick values of said migrated old processes are reassigned to values above said predetermined migtick threshold so that said migrated old processes become young based on their reassigned migtick values.

24. The method of claim 13, wherein when said old processes are migrated, the migtick values of said migrated old processes are reassigned to values above said predetermined migtick threshold so that said migrated old processes become young based on their reassigned migtick values.

* * * * *

UNITED STATES PATENT AND TRADEMARK OFFICE
CERTIFICATE OF CORRECTION

PATENT NO. : 5,506,987
DATED : April 9, 1996
INVENTOR(S) : K.D. Abramson et al.

It is certified that error appears in the above-indentified patent and that said Letters Patent is hereby corrected as shown below:

| COLUMN | LINE | |
|---|---|---|
| 2 | 3 | After "symmetric" insert --multiprocessing systems that-- |
| 2 | 4 | After "without" delete "multiprocessing systems that" |
| 9 | 42 | "readilar" should read --readily-- |

Signed and Sealed this

Twenty-third Day of July, 1996

Attest:

BRUCE LEHMAN

Attesting Officer

Commissioner of Patents and Trademarks